Sept. 5, 1967        R. A. TIDBALL ET AL        3,340,159
SEA WATER SCALING CONSTITUENTS REMOVAL
AND FLASH DISTILLATION
Filed May 18, 1964
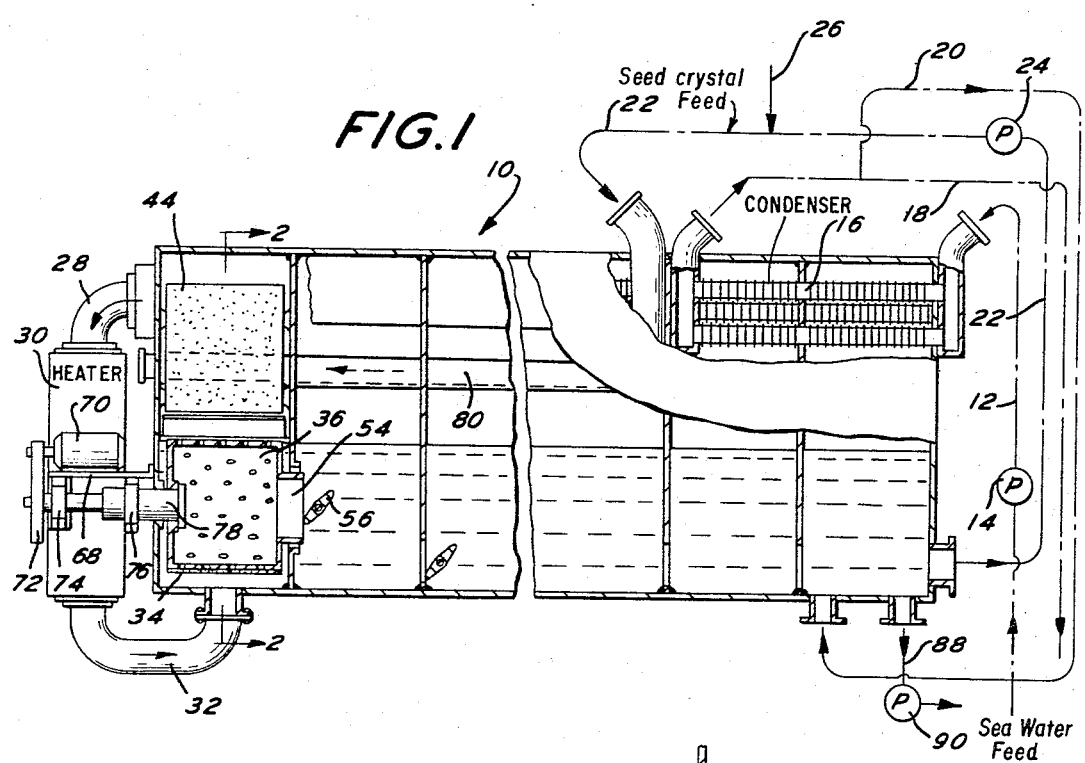
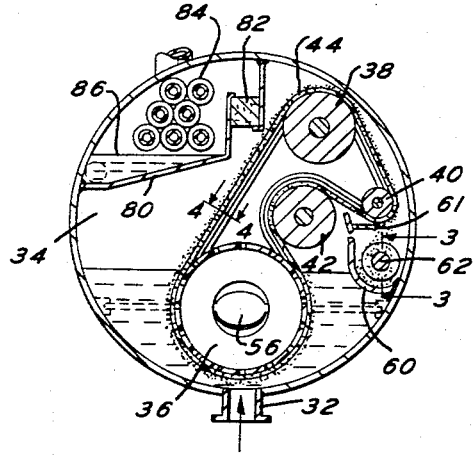
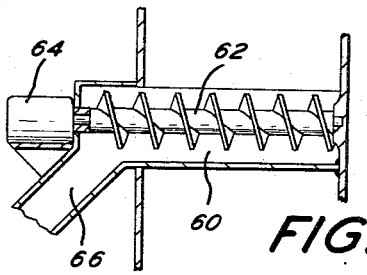
INVENTORS.
ROBERT A. TIDBALL
WILLIAM M. KING
PHILIP S. OTTEN
BY *Seidel & Gonda*
ATTORNEYS.

3,340,159
SEA WATER SCALING CONSTITUENTS REMOVAL
AND FLASH DISTILLATION
Robert A. Tidball, Swarthmore, William M. King, Springfield, and Philip S. Otten, Media, Pa., assignors, by mesne assignments, to Baldwin-Lima-Hamilton Corporation, Philadelphia, Pa., a corporation of Delaware
Filed May 18, 1964, Ser. No. 368,118
4 Claims. (Cl. 203—7)

ABSTRACT OF THE DISCLOSURE

A method and apparatus for removing scaling constituents from sea water in a multi-stage flash distilling plant, the method comprising the steps of introducing particles of scale-forming material into raw sea water; heating the mix thereby formed to a temperature above 250° F.; placing the mix in the first stage of the evaporator, thereby causing a portion of the water to evaporate; and simultaneously with such evaporation, removing the scale-forming particles and scale adhering hereto from the water by filtration; and then conducting the remaining water to another stage of the evaporator for evaporating a further portion thereof. The apparatus comprises a multi-stage flash evaporator having a mechanical filter in its first stage.

---

This invention relates to the removal of scaling constituents found in sea water in a multi-stage flash distilling plant.

One of the most economical methods of developing sufficient energy to make potable water from sea water in a multi-stage flash distilling plant is to raise the temperature of the sea water entering the first stage of the plant as high as feasible. However, several of the salts present in sea water are less soluble in hot sea water than in cold sea water. These salts include calcium carbonate, magnesium hydroxide, and calcium sulfate. Hence, if the sea water inlet temperature to the multi-stage flash distilling plant is raised too high, some of these salts will begin precipitating and form scale on the condensers and walls of each flash chamber.

Untreated sea water can be heated to approximately 165° F. without the initiation of rapid scaling. To date, chemical treatment systems have been developed to increase the upper temperature limits to 250° F. It has been found that by inserting seed crystals of the scaling salts in the flowing brine stream, the salts which precipitate as the brine is heated, grow on the seed crystals rather than on the condenser tube walls or the walls of the flash chambers. The precipitate is removed from the brine overboard stream and a portion returned to the brine recycle stream to maintain a continuing scale retarding system.

At temperatures above 250° F., calcium sulfate will precipitate from the sea water. If the seeding method described above is used, it has been found that the calcium sulfate precipitate will grow on the calcium sulfate crystals. However, the precipitated calcium sulfate will redissolve as the brine is cooled below 250° F. in the flash chambers of the distilling plant. This prevents removal of a controlled amount of the precipitant in the brine overboard stream.

The redissolving of the calcium sulfate precipitate in the brine as it is cooled will slowly increase the concentration of calcium sulfate in the brine recycle until scale control becomes impossible. Therefore, if temperatures above 250° F. are to be obtained in a multi-stage flash distilling plant, it is necessary to remove the precipitated calcium sulfate solids from the brine stream at a temperature before they can redissolve.

Accordingly, it is an object of this invention to disclose a method and apparatus for removing scaling salts from sea water at a temperature above 250° F.

A more particular object of this invention is to disclose an apparatus and method for removing the scaling salts found in sea water after they have precipitated and before they can redissolve in the sea water as it passes through a multi-stage flash distilling plant.

A further object of this invention resides in the provision of apparatus in the first stage of multi-stage flash distilling plant for removing the scaling constituents precipitated from sea water at a temperature above 250° F., before the scale has a chance to redissolve in the sea water as it passes through the flashing stages in the plant.

Other objects will appear from the disclosure which follows hereinafter.

For the purpose of illustrating the invention, there is shown in the drawings a form which is presently preferred; it being understood, however, that this invention is not limited to the precise arrangements and instrumentalities shown.

FIGURE 1 is a diagrammatic view, partly in section, of the apparatus of the present invention.

FIGURE 2 is a cross sectional view taken substantially along the plane indicated by the line 2—2 of FIGURE 1 and illustrating a filter unit for removing the scaling precipitates.

FIGURE 3 is a cross sectional view taken substantially along the plane indicated by the line 3—3 of FIGURE 2.

FIGURE 4 is a cross sectional view taken substantially along the plane indicated by the line 4—4 of FIGURE 2.

The invention described hereinafter is a method and apparatus for removing precipitated solids from the brine stream at the hot end of a multi-stage flash distilling plant generally designated by the numeral 10. A portion of the removed precipitant can then be reinserted in the brine recycle stream for continued scale control.

Fresh sea water is pumped by a pump 14 along the fresh sea water intake line 12 into the condensers 16 in the last two stages of the plant 10. This sea water is heated and is discharged through a conduit 18. A portion of the heated sea water is tapped from the conduit 18 and caused to flow through a conduit 20 into the last stage of the plant 10. The sea water in the conduit 20 comprises a sea water make-up and mixes with some of the distilled sea water in the last stage. The fresh mixture is recycled by a pump 24 through a conduit 22 back into the plant 10.

A controlled amount of scaling constituents in the form of seed crystals are inserted in the brine recycle line 22 through a seed crystal feed line 26 prior to the introduction of the recycle brine into the plant 10. The mixture of recycled brine and seed crystals are heated in the condensers of the discrete stages of the plant 10 and passed into a brine heater 30 through a brine heater inlet conduit 28. The heater 30 is adapted to heat the brine to a temperature above 250° F.

At temperatures above 250° F., various forms of calcium sulfate are precipitated from the brine. It has been found that the precipitating crystals of calcium sulfate will cling to the seed crystals originally placed in the brine stream, rather than settling on the condenser tubes within the plant 10. However, the precipitated calcium sulfate has been found to redissolve as the brine is cooled below 250° F. in the flash chambers of the plant 10. Hence, the precipitant must be removed before the temperature of the brine is reduced below 250° F. in the plant 10. Otherwise, the precipitant will rapidly redissolve in the brine as it is cooled, slowly increasing the concentration of calcium sulfate in the brine recycle until scale control becomes impossible.

Since the brine temperature entering the first flash stage of the plant 10 is above 250° F., the precipitants should be removed either in the first stage or just prior to the first stage. In order to conserve space and to make use of existing structure in the plant 10, we have elected to remove the precipitants in the first stage 34.

Normally, the brine enters the first stage 34 through a nozzle and the pressure therein is reduced slightly, causing part of the brine to vaporize to the condensers. The remainder of the brine flows into the second stage where additional vaporization takes place. This vaporization process continues through "n" number of stages until the brine temperature has approached the sea water temperature and additional cooling cannot be achieved. As previously stated, the object of this invention is to remove precipitated solids from the brine stream between the vaporizing operation in the first stage and the second stage.

This is achieved as follows:

A perforated drum 36 is rotatably mounted between the walls of the first flash stage 34. Secured to a wall of the plant 10 is a platform 68 supporting an electric motor 70. An endless pulley belt 72 connects a pulley on the motor shaft to a pulley on a shaft 78 supported by bearings 74 and 76 suspended from the platform 68. The shaft 78 is frictionally connected to the drum 36. Therefore, upon actuation of the motor 70, the drum 36 will be rotated by the shaft 78.

A plurality of rollers 38, 40, and 42 are also mounted between walls of the first stage as shown in FIGURE 2. A perforated belt 44 is wrapped around the drum 36, around the rollers 38, 40 and 42, back to the drum 36. The belt 44 is constructed of a perforated low friction material such as Teflon and fine filter media such as cloth or fine wire mesh 48.

A pair of angle irons 50, 52 are adapted to support the belt 44 above the drum 36. The angle irons guide the belt and cause it to follow a predetermined path. The Teflon strips at the end of the belt 44 form a sliding seal with the angle irons 50, 52.

Brine heated above 250° F. by the heater 30 enters the first stage 34 of the multi-stage distilling plant 10 through a conduit 32. Calcium sulfate and other scaling salts precipitate from the brine and adhere to the seed crystals initially introduced within the brine recycle stream. The brine will flow through the perforated belt 44 and drum 36 into the hollow interior of the drum. The precipitated solids will not be able to pass through the porous belt 44 but will form a filter cake on its outer surface.

As the drum 36 rotates, the belt 44 will carry the filtered precipitants to a sludge collection trough 60 mounted between the walls of the first stage 34. The precipitants fall by gravity into the trough 60. A scraper blade 61 is adapted to scrape any clinging precipitants from the belt 44 and cause them to fall into the trough 60.

A screw conveyor 62 rotated by a motor 64 is disposed within the trough 60. The conveyor 62 will deliver the collected sludge to a chute 66 for removal from the plant 10.

As the brine enters the first stage 34, a portion of the brine will vaporize due to the reduced pressure within said stage. The vapors will pass through a filter 82, give up their heat to the condensers 84 in the first stage, and be collected as fresh water 86 within a trough 80 below the condensers 84. The remaining brine passes into the hollow interior of the drum 36. The drum 36 includes an axially extending nozzle 54. The nozzle 54 extends through the dividing wall of the first and second stages of the plant 10 and hence connects them. A damper 56 is positioned between the walls of the second stage to control the flow of sea water from the drum 36 into the second stage.

When the brine reaches the second stage in the plant 10, it is substantially free of scaling constituents. Additional vaporization takes place here and the temperature of the brine is further lowered. Since the precipitants have been removed, they cannot redissolve and scaling is effectively controlled.

The brine continues to pass through succeeding stages in the plant 10, vaporizing and cooling. A portion of the brine is removed through a brine discharge line 88 by means of a pump 90. Another portion of the brine is mixed with sea water make-up entering through the line 20 and the mixture is then recycled as described above.

The collected precipitants may then be recycled in a controlled manner through the seed crystal feed. The concentration of dissolved solids in the brine is hence controlled and kept within limits.

The present invention may be embodied in other specific forms without departing from the spirit or essential attributes thereof and, accordingly, reference should be made to the appended claims, rather than to the foregoing specification as indicating the scope of the invention.

We claim:

1. In a multi-stage distilling plant for distilling sea water, means for filtering scaling constituents precipitated from said sea water at a temperature above 250° F., said means including a first stage distilling unit, means for introducing sea water into said first stage at a temperature above 250° F., a perforated, hollow drum, said drum being rotatably mounted in said first stage and admitting only sea water introduced into said first stage into its hollow interior, an endless perforated conveyor belt rotatable by drum adapted to collect on its surface the precipitated scaling constituents not passed to the interior of said drum, means connected to said drum for driving said drum and said belt, a sea water discharge conduit projecting from said drum, said conduit communicating the interior of said drum with a second stage distilling unit, and a scale collection receptacle adjacent a portion of said conveyor belt adapted to receive the scaling constituents collected on the surface of said endless belt.

2. In a multi-stage distilling plant in accordance with claim 1, said first stage including opposed walls, a shelf on said walls for supporting and guiding movement of said conveyor belt, said belt including means for forming a seal with the supporting shelf.

3. A method for removing scaling constituents from sea water in a multi-stage flash distilling plant comprising the steps of introducing crystal of the scaling constituents to be removed into said sea water, thereafter introducing said sea water and said crystals into said distilling plant, heating said sea water and crystals to a temperature above 250° F. and immediately thereafter introducing said sea water into the first stage of the distilling plant, thereby causing the scaling constituents within said sea water to precipitate and adhere to said crystals, separating said crystals and clinging scaling constituents from said sea water by passing the water through a filter in the first stage of the distilling plant, and simultaneously evaporating a portion of said sea water in the first stage of said distilling plant and continuously and simultaneously removing the crystals from the first stage, and then evaporating a further portion of said filtered sea water in another stage of said distilling plant.

4. A method in accordance with claim 3 wherein said separating step includes passing only sea water through a perforated drum, and an enless perforated conveyor belt rotatable on said drum, thus forming a filter cake of the unpassed crystals and clinging scale on said conveyor belt and conveying said crystals and clinging scale to a collection receptacle.

References Cited

UNITED STATES PATENTS

| | | | |
|---|---|---|---|
| 1,399,845 | 12/1921 | Bull | 159—47 |
| 2,600,820 | 6/1952 | Whatley | 203—7 X |
| 2,649,408 | 8/1953 | Williamson et al. | 203—7 X |
| 2,979,442 | 4/1961 | Badger | 203—7 |
| 3,026,261 | 3/1962 | Mayfield et al. | |
| 3,075,647 | 1/1963 | Davis | 210—401 |
| 3,147,072 | 9/1964 | Thomsen. | |

FOREIGN PATENTS 641,429   8/1950   Great Britain.

NORMAN YUDKOFF, *Primary Examiner.*

F. DRUMMOND, *Assistant Examiner.*